Patented Sept. 8, 1931

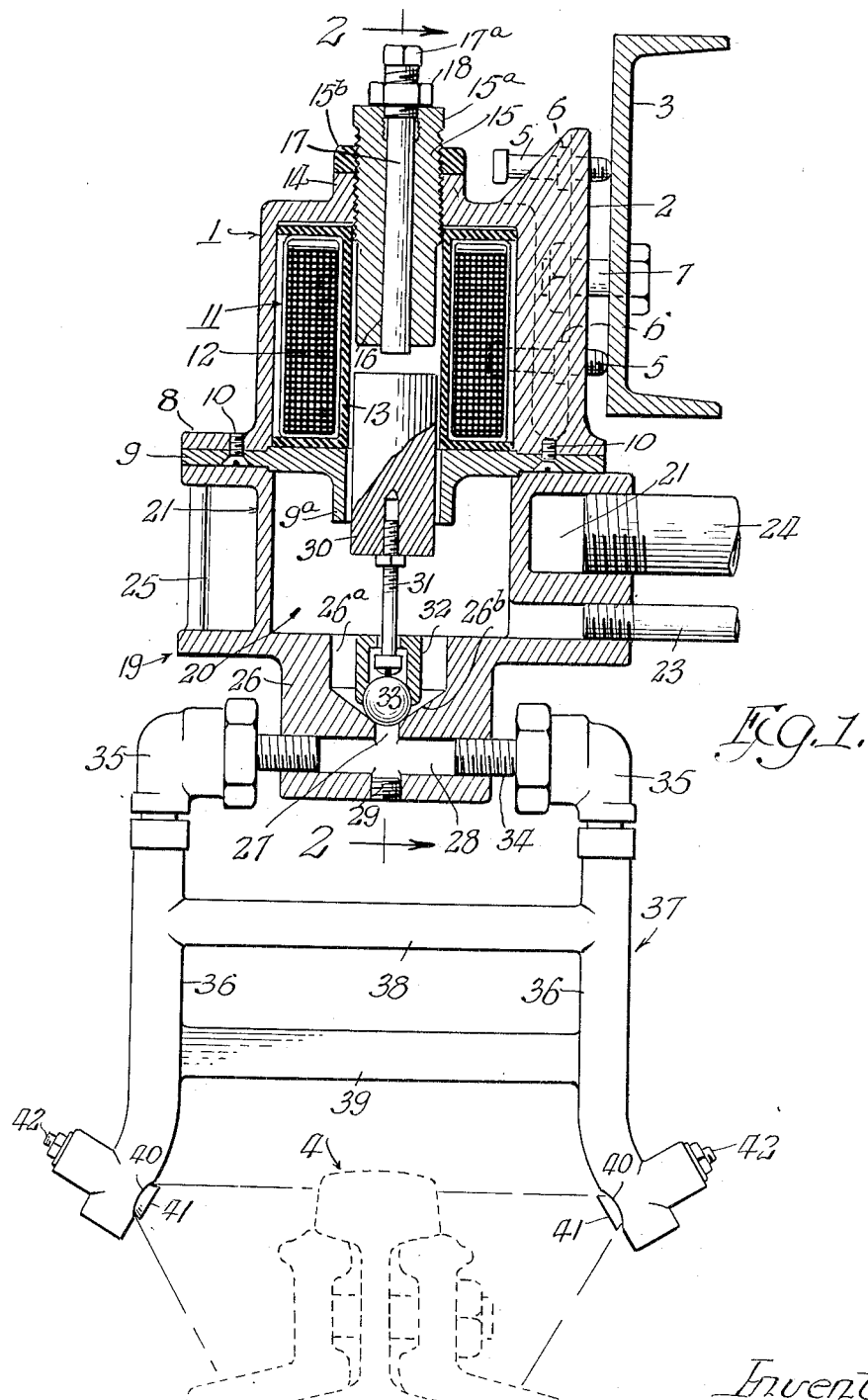

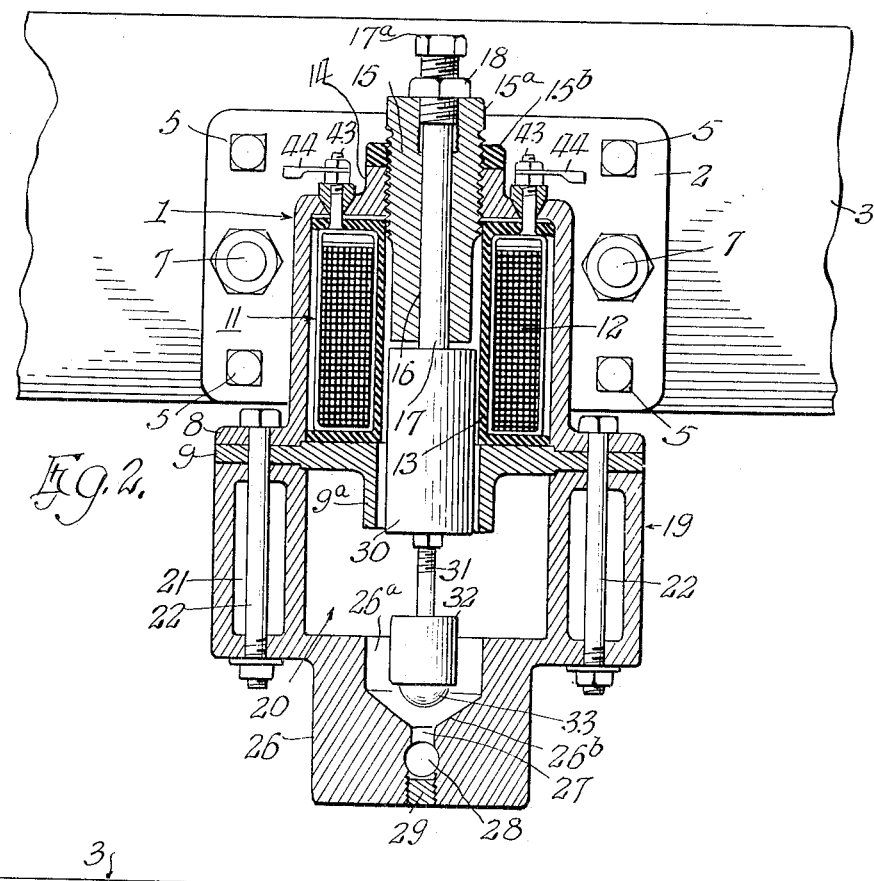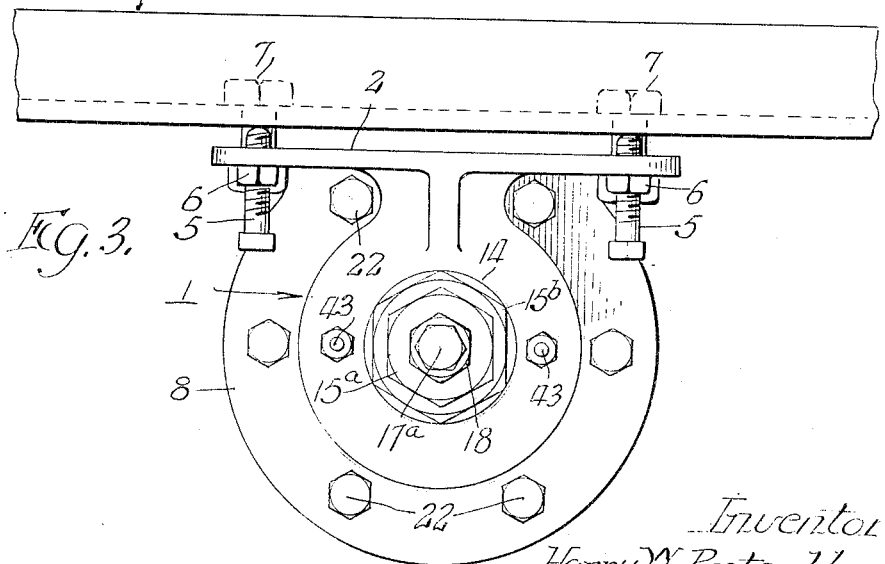

1,822,668

UNITED STATES PATENT OFFICE

HARRY W. PROTZELLER, OF EAST CHICAGO, INDIANA, ASSIGNOR TO O. F. JORDAN COMPANY, OF EAST CHICAGO, INDIANA, A CORPORATION OF INDIANA

ELECTROMAGNETIC VALVE

Application filed February 23, 1927. Serial No. 170,298.

This invention relates to improvements in electro-magnetic valves and it consists of the matters hereinafter described and more particularly pointed out in the appended claims.

The primary object of the invention is to provide a valve of this kind especially adapted for heavy duty such as is imposed upon it when embodied in a rail joint oiler and which is simple in construction and positive in operation and readily adjustable from outside the valve casing.

A further object of the invention is to provide a valve of this kind wherein the depth of the gap between the stationary and movable armature parts may be readily adjusted to determine the speed of operation of the valve as well as to control the effectiveness of the residual magnetism between the armature parts, when the coil thereof is de-energized, so that the valve may be held open by said residual magnetism a greater or lesser time as desired.

These objects of the invention as well as others, together with the many advantages thereof, will more fully appear as I proceed with my specification.

In the drawings:

Fig. 1 is a vertical sectional view through one form of electro-magnetic valve embodying my invention as when employed in a rail joint oiler.

Fig. 2 is another vertical sectional view through the same as taken on the line 2—2 of Fig. 1.

Fig. 3 is a top plan view of the valve.

My improved valve is herein shown as employed to control the flow or passage of a fluid to the spray nozzles of a rail joint oiler and will be described as such for the purpose of illustration only because as is apparent it may also be employed for purposes other than rail joint oiler work.

Referring now in detail to that embodiment of the invention illustrated in the accompanying drawings, 1 indicates as a whole the open bottom steel annular magnet casing part of my improved valve. Said part is provided on one of its sides with an integral, elongated flange 2 by means of which it may be attached in the desired adjusted position, to one of the side sills or supporting frame members 3 of a vehicle adapted to travel upon the rails 4 of a track, only one of such rails being indicated in dotted lines in Fig. 1. To accurately position the casing part 1 upon the member 3, so that its axis may be disposed in the median plane of the rail, I provide pairs of vertically spaced adjusting set screws 5 and associated jam nuts 6 at each end of the flange 2, said screws being threaded through said flange ends. Between the screws of each pair of set screws is provided an attaching bolt and nut 7 which bolt takes through said flange end and member 3. By manipulating the set screws the axis of said casing part may be accurately disposed with respect to the rail after which the bolts and nuts 7 are tightened up to rigidly secure the casing to the supporting frame member 3. The magnet casing part, is provided at its open bottom end with an outwardly extending radial flange 8 against which fits a steel annular plate 9 having a centrally disposed downwardly depending similar flange 9a. Said plate is fixed to the flange 8 by screws 10 (Fig. 1) and forms the bottom of an annular chamber 11 in said casing part 1 in which an annular coil 12 of an electro-magnet is located, the coil being electrically insulated from said casing part and plate by means of insulation material 13.

On the top wall of the casing part 1 is an upwardly extending interiorly threaded boss 14 disposed coaxially with the chamber 11 and threaded into said boss is a tubular plug 15 of magnetic material. The top end of said plug is formed to provide a head 15a adapted to receive a wrench for turning said plug in either direction to determine the position of its bottom end with respect to the interior of the coil. A lock nut 15b is threaded on said plug to hold it in the desired adjusted position. Coaxially of the plug is a bore 16 the top end of which is interiorly threaded to receive a stem or rod 17 of non-magnetic material such as bronze. The top end of said stem is exteriorly threaded and has a head 17a to receive a wrench so that the stem may be adjusted vertically relative to the plug, a nut 18 being threaded onto the top end of the stem to lock it in the desired position. Ordinarily the bottom end of the stem projects a short distance below the bottom of the plug for a purpose to appear later.

Associated with the casing part 1 and plate 9 is a hollow base casing 19 on non-magnetic material (brass or aluminum) which has an inner upwardly opening central chamber 20 and an outer annular chamber 21 surrounding the same. The inner chamber constitutes a fluid pressure chamber and the outer chamber constitutes a heating chamber therefor. Said base casting is secured in place by a plurality of arcuately spaced bolts and associated nuts 22 which bolts pass through the flange 8, plate 9 and outer chamber parts of the base casting 19, as best shown in Fig. 2, the nuts being threaded onto the bottom ends of the bolts. Fluid under pressure is admitted to the chamber 20 by a pipe 23 arranged at the rear of the casting 19 and a heating medium is admitted to the chamber 21 by a pipe 24 arranged just above the pipe 23. On the front of the base casting 19 is an exhaust port 25 through which the heating medium is discharged to atmosphere, when the heating medium employed is for example the exhaust gases of an internal combustion engine such as may be employed to propel the vehicle adapted to travel on the rails 4 as before mentioned.

On the bottom of the base casting is an axially disposed, depending boss 26 in which is formed a recess 26a that opens into the chamber 20. The bottom end of said recess is tapered to form a valve seat 26b and this recess is connected by a port 27 with a transverse passage 28 near the bottom of the boss. A clean out aperture and plug 29 provides means for draining the chamber 20, recess 26a and passage 28 when necessary.

30 indicates the movable armature part of the magnet which is in the form of a cylinder of magnetic material having a guiding bearing in the flange 9a of the plate 9. To the bottom end of said movable armature is adjustably fixed a stem 31 on non-magnetic material in the form of a bolt the bottom headed end of which is arranged in an inverted cup or cage 32. This provides for the initial adjustment or setting of the valve, i. e., determines the amount that the valve opens. To the open bottom end of a cage is secured a valve member 33 in the form of a ball adapted to engage on the tapered valve seat 26b in the boss 26. The connection between the stem and cage provides for a limited amount of play or lost motion, so that when the coil is energized, the stem receives an impetus or start before it picks up the cage to lift the ball valve of the seat 26b. Thus the load of lifting the valve off the seat against the pressure of the fluid in the chamber 20 is readily overcome, and the speed of valve-opening increased.

In each end of the passage 28 is threaded a nipple 34 and to each nipple is operatively connected a swing joint elbow fitting 35. To said fittings are secured the top ends of upright tubular members 36—36 of a spray nozzle head indicated as a whole at 37, said members being cross connected near their top ends by an equalizing conduit 38 and near their bottom ends by a cross bar 39. Suitable means (not shown) is connected to the cross bar whereby the spray nozzle head may be swung about an axis defined by the nipples 34 into and out of operative position with respect to the rail 4. The bottom end of each member 36 is turned outwardly and is suitably plugged and in each end facing the rail is a valve seat like discharge orifice 40 with which is associated the head 41 of a valve stem 42. This stem is held in its open position by the pressure of the fluid being sprayed.

Extending through the top wall of the casing part 7 in the terminal posts 43—43 for the coil 12 to which the terminals 44—44 of conductors leading from a current supply are attached.

In the movement of the vehicle along the rails, suitable means thereon (not herein shown) engages the plates of the rail joints as they are approached and closes the circuit to the coil 12 and holds the same closed so long as said means is in contact with the rail joint plates. When the circuit is thus closed, the coil is energized and attracts the armature or core 30 and moves the same upwardly until it engages the end of the stem 17. This lifts the valve 33 from the seat and permits fluid under pressure to pass from the chamber 20 into the recess 26a and port 27 to the passage 28. From there it enters the nipples 35 and passes into the tubular parts 36 of the spray nozzle head to pass out through the valve apertures 40 to be delivered in the form of conical sprays upon the plates of the rail joint.

By turning the adjustable tubular plug 15 in one direction or the other, the amount of movement of the movable armature member 30 may be carefully determined together with the lift of the valve ball 33 from the seat 26b. Thus the amount of fluid delivered to the nozzle may be accurately regulated and this from outside of the valve casing as a whole. By threading the non-magnetic stem 16 in one direction or the other, the gap between the plug 15 and armature 30, after movement of said armature 30, may be varied whereby when the coil is de-energized the residual magnetism of the plug 15 will support the armature 30 for the desired period and hence hold the valve open for a greater or lesser period of time by virtue of the same residual magnetism.

When the bottom end of the stem becomes flattened and battered to that extent wherein said gap is inoperative for its intended purpose, the same may be increased again by turning the stem so that its bottom end provides an extension below the bottom end of the plug 15 to provide the gap which overcomes said residual magnetism. This adjustment may also be made from outside the casing.

It is apparent that the valve as described and that the amount of movement of the movable armature may be controlled to regulate the amount of fluid delivered to the spray nozzles. Furthermore, the extent of the gap between the fixed armature and the movable armature, when the valve is in its open position, may be easily and accurately varied with the result that the extent of time that the residual magnetism will support the movable armature (after the de-energizing of the coil) and hence retain the valve in open position may be controlled at will, through a wide range. A fine and accurate control is thus obtained. The valve is especially adapted for heavy duty work, is strong and rugged and may be readily taken apart for inspection and as readily assembled.

Lost motion between cage 32 and stem 31 allows cage 32 and ball 33 to tilt from axis of stem 31 when ball is seated. As ball is lifted this lost motion imparts rotary motion to ball so that seating of ball 33 on seat 26b is not always on same place thus insuring a good tight fit at all times, greatly increasing life and condition of valve seat.

While in describing my invention, I have referred in detail to various forms of the parts thereof, the same is intended as by way of illustration only so that I do not wish to be limited thereto except as may be pointed out in the appended claims.

I claim as my invention:

1. A valve of the kind described, embodying therein a casing having an integral top wall with an annular boss thereon, said boss having a threaded aperture therethrough, an annular electromagnetic coil in said casing, a tubular plug threaded into said boss and extending into the interior of said coil said plug being formed of magnetic material, a non-magnetic member disposed axially within, and longitudinally adjustable of, said plug, both said member and the plug being accessible from without the casing for adjustments relative to each other and within the coil, and an armature movable in said coil toward and away from said plug and limited in its movement toward said plug by said member disposed axially therein.

2. A valve of the kind described, comprising a casing for containing fluid under pressure, said casing being provided with a discharge port in its bottom wall, an inlet conduit communicating with the casing, a coil casing disposed above said fluid containing casing, a partition plate located between the two casings and provided with an aperture, an apertured boss at the upper end of the coil casing, a plug threaded in said apertured boss, a rod adjustable within said plug, said rod being of greater length than the plug with its inner end projecting below the inner end of the plug and its outer end accessible for adjustment, an armature in the coil casing and projecting through the aperture in the plate into the fluid containing casing, a valve connected to said armature for opening and closing the discharge port in the fluid containing casing, the discharge port, the armature and the plug all being disposed in substantial vertical alignment.

In testimony whereof, I have hereunto set my hand, this 15 day of February, 1927.

HARRY W. PROTZELLER.